United States Patent [19]

Hanson

[11] Patent Number: 5,692,069
[45] Date of Patent: Nov. 25, 1997

[54] APPARATUS FOR PERFORMING CHARACTER SEGMENTATION USING SLANT HISTOGRAMS

[75] Inventor: John Douglas Hanson, Rochester, N.Y.

[73] Assignee: Eastman Kodak Company, Rochester, N.Y.

[21] Appl. No.: 406,264

[22] Filed: Mar. 17, 1995

[51] Int. Cl.$^6$ .................................................. G06K 9/34
[52] U.S. Cl. ..................................... 382/171; 382/178
[58] Field of Search ............................. 382/173, 177, 382/178, 174, 171, 179; 395/144, 148

[56] References Cited

U.S. PATENT DOCUMENTS

| | | | |
|---|---|---|---|
| 3,219,974 | 11/1965 | Rabinow | 382/173 |
| 4,379,282 | 4/1983 | Bailey | 382/9 |
| 4,449,239 | 5/1984 | Bernhardt et al. | 382/9 |
| 4,466,121 | 8/1984 | Damen et al. | 382/9 |
| 4,594,732 | 6/1986 | Tsuji | 382/9 |
| 4,635,290 | 1/1987 | Tsuji et al. | 382/9 |
| 4,680,803 | 7/1987 | Dilella | 382/9 |
| 4,736,441 | 4/1988 | Hirose et al. | 382/48 |
| 4,776,024 | 10/1988 | Katoh et al. | 382/9 |
| 4,827,529 | 5/1989 | Peppers et al. | 382/9 |
| 4,845,768 | 7/1989 | Kochert et al. | 382/46 |
| 4,847,912 | 7/1989 | Tanaka et al. | 382/9 |
| 5,001,766 | 3/1991 | Baird | 382/46 |
| 5,031,225 | 7/1991 | Tachikawa et al. | 382/21 |
| 5,046,114 | 9/1991 | Zobel | 382/9 |
| 5,062,141 | 10/1991 | Nakayama et al. | 382/9 |
| 5,101,439 | 3/1992 | Kiang | 382/9 |
| 5,105,470 | 4/1992 | Will | 382/21 |
| 5,159,667 | 10/1992 | Borrey et al. | 395/148 |

*Primary Examiner*—Andrew Johns
*Attorney, Agent, or Firm*—Raymond L. Owens

[57] ABSTRACT

An apparatus for performing character segmentation of digitized handwritten character data utilizes a vertical histogram processing unit to identify primary cuts to be made in the character data based on a vertical histogram. Character blocks generated after the primary cuts are analyzed to determine if the character blocks contain multiple characters. A slant histogram processing unit then generates a set of slant histograms for each of the character blocks to identify minima indicative of segmentation points. The slant histograms are evaluated by an evaluation processing unit to determine segmentation points for kerned characters based on zero-value minima. After segmenting the kerned characters to generated new character blocks, the evaluation processing unit evaluates the minima in accordance with a set of predetermined rules to identify further segmentation points for touching characters.

7 Claims, 4 Drawing Sheets

APPARATUS FOR PERFORMING CHARACTER SEGMENTATION USING SLANT HISTOGRAMS

FIELD OF THE INVENTION

The invention relates in general to an apparatus for performing optical character recognition. More specifically, the invention relates to an apparatus for performing character segmentation of handwritten kerned and touching characters based on a set of slant histograms prior to performing a character recognition operation.

BACKGROUND OF THE INVENTION

Character segmentation of raster encoded text image lines is relatively easy if vertical columns of empty space exist between all the characters in a line. In many cases, however, the provision of empty space between characters of handwritten text does not occur, as one or more strokes of one character may be joined to strokes of one or more other characters. Although the joining of strokes may be unintentional, many writers have handwriting styles that combine certain pairs of character classes to reduce the number of times that a writing instrument must be lifted.

Another major problem for character segmentation is the problem of kerned characters. In the case of kerned characters, part of one character overhangs part of another character, if the characters are examined in the vertical direction, thereby obscuring the separability of the characters. The condition of kerned characters occurs frequently in handwriting styles that have a significant amount of slant, so that many taller characters tend to lean over adjacent lower characters. Another example of kerned characters can be found in the handwriting of individuals who write certain horizontal strokes, like the top of a "T" or a "5", as extended strokes that overlap into the space of their neighboring characters.

The above problems are also complicated by the fact that more than two characters may be linked by touching or kerning within a given word or sequence of numbers. For example, in handwriting with a significant degree of slant, it is common for several consecutive characters to each overlap the succeeding character, thereby producing a string of kerned characters. It is necessary to separate the kerned characters prior to performing a character recognition operation in order to assure successful recognition of the individual characters.

It is therefore an object of the invention to provide an apparatus for performing character segmentation of digitized handwritten character data in order to improve the reliability of character recognition operations.

SUMMARY OF THE INVENTION

An apparatus for performing character segmentation of digitized handwritten character data utilizes a vertical histogram processing unit to identify primary cuts to be made in the character data based on a vertical histogram. Character blocks generated after the primary cuts are analyzed to determine if the character blocks contain multiple characters. A slant histogram processing unit then generates a set of slant histograms for each of the character blocks to identify minima indicative of segmentation points. The slant histograms are evaluated by an evaluation processing unit to determine segmentation points for kerned characters based on zero-value minima. After segmenting the kerned characters to generated new character blocks, the evaluation processing unit evaluates the minima in accordance with a set of predetermined rules to identify further segmentation points for touching characters.

BRIEF DESCRIPTION OF THE DRAWINGS

The invention will be discussed in greater detail with reference to the accompanying drawings, wherein.

DETAILED DESCRIPTION OF THE PREFERRED EMBODIMENT

Figures 1, 2, 3, 4, 5, 6:
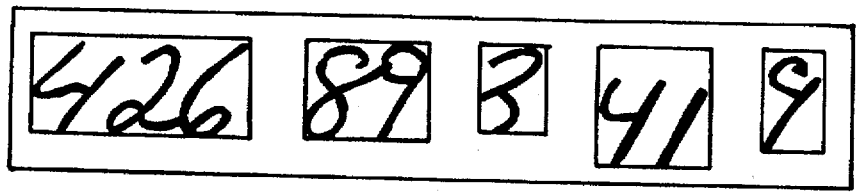
FIG. 1 is an example of a text line illustrating touching and kerned characters.
FIG. 2 illustrates the grouping of the characters illustrated in FIG. 1 into blocks based on vertical segmentation.
FIG. 3 illustrates the use of a slant histogram to identify zero points in the first block illustrated in FIG. 2.
FIG. 4 illustrates the use of a slant histogram to identify zero points in the fourth block in FIG. 2.
FIG. 5 illustrates the use of a slant histogram to identify a segmentation point associated with a minima in the first block illustrated in FIG. 2.
FIG. 6 illustrates the use of a slant histogram to identify a segmentation point associated with a minima in the fourth block illustrated in FIG. 2.

A sample scanned text line that illustrates the two major problems in segmentation discussed above, namely, touching and kerned characters, is illustrated in FIG. 1. The text line is extracted, for example, from the scanned image of a United States 1040 tax form. The image includes pre-printed material from the tax form itself, including a guide line 10, two dashed separator lines 12 and a title 14 above the guide line 10 and separator lines 12. A string of digits is handwritten on the guide line 10. Some of the digits are touching, such as the "2" and "6" and the "8" and "9", while some of the digits represent kerned characters, such as the "4" which overlays the "2" and the second "4" which overlays the "1".

The handwritten digits can be readily separated into five distinct groups based on the vertical space that exists between some of the digits as illustrated in FIG. 2. At this point, the use of a vertical segmentation process would be sufficient to isolate at least two of the characters, namely, the "3" and the final "9" in the series. Accordingly, further segmentation processing would not be required for the isolated characters prior to performing a character recognition operation. Three blocks of characters remain, however, that require some form of further segmentation prior to character recognition. Two pairs of the remaining characters are touching, namely, the "2" and the "6" in the first block and the "8" and the "9" in the second block. In addition, there are also two cases of kerned characters. In each case, a "4" is leaning sufficiently to vertically overhang the lower left of the succeeding character, namely, the "2" and the "1" as previously mentioned.

In accordance with the invention, a set of slant histograms are employed to identify where the remaining characters within the blocks can be separated. By using a slant histogram where the columns are slanted to the right, for example with $\Delta Y/\Delta X=3$, a zero value minima can be found which indicate separations that can be made between the "4"s that are kerned in the first and fourth blocks of FIG. 2. FIGS. 3 and 4 demonstrate the cuts that can be made based on the identification of a zero value minima in the slant histograms.

Figure 7:
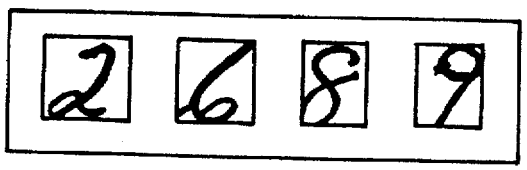
FIG. 7 illustrates separated touching characters from the first and fourth blocks illustrated in FIG. 2.

A zero value minima in the slant histograms will not occur when two characters touch, although a non-zero value minima will occur. A minima occurs because two characters usually touch at only a single point related to the width of a single stroke, whereas the main body of a character will comprise more than one stroke. Based on this assumption, in conjunction with an assessment of the relationship of the minima to its neighboring peaks, a judgement can be made as to whether a segmentation point is identified by the minima. Accordingly, additional segmentation can be accomplished by applying different histograms having different slants to the characters in the remaining blocks and identifying minima that fall within accepted criteria. FIGS. 5 and 6, for example, illustrate a cut in the first block that is generated from a non-zero value minima in a histogram with a slant $\Delta Y/\Delta X=3$, and a cut in the second block that is generated from a non-zero value minima in a histogram with a slant $\Delta Y/\Delta X=4$. FIG. 7 illustrates the appearance of the touching characters after separation. The separated characters may contain small pieces of one of the other characters. These small pieces, however, are generally small enough to prevent problems with character recognition.

Figure 8:
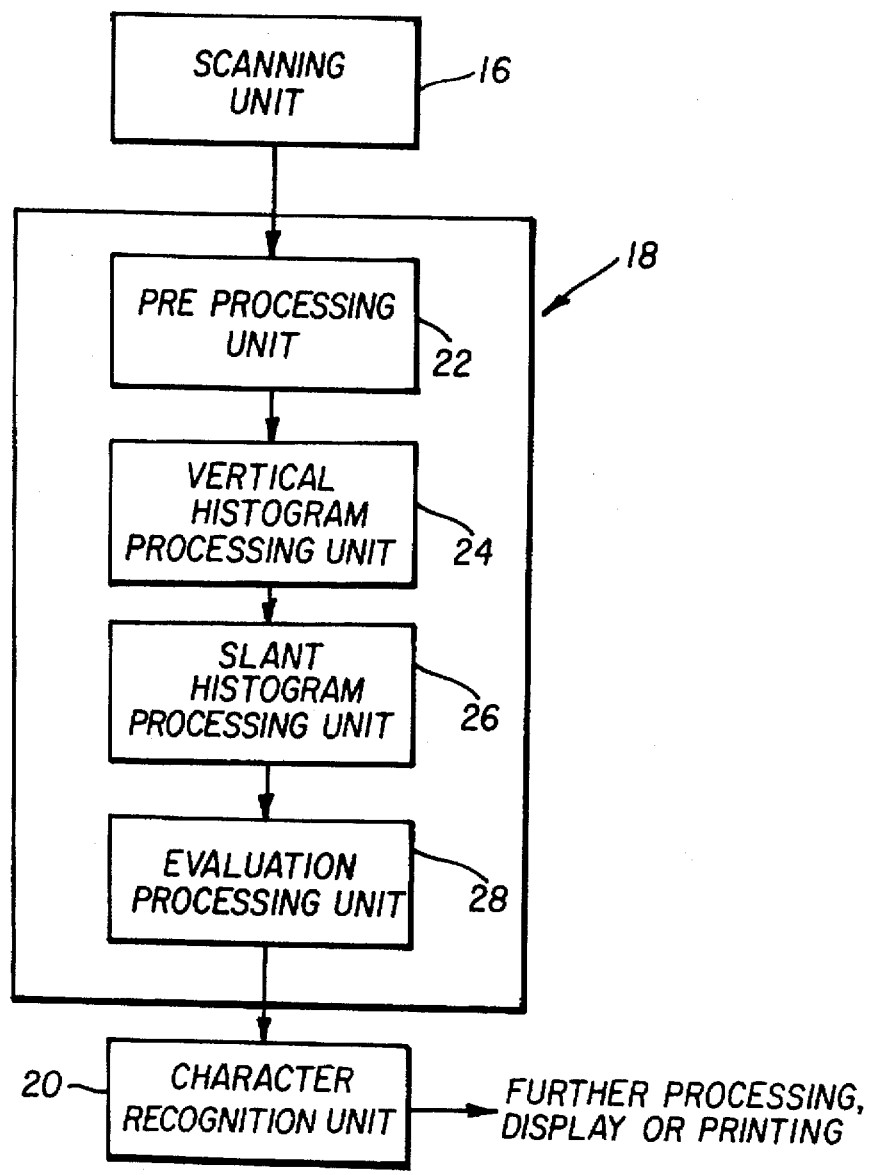
FIG. 8 illustrates a block diagram of a system in accordance with the claimed invention.

Referring now to FIG. 8, a system for performing character recognition in accordance with the present invention is shown including a scanning unit 16, a segmentation unit 18, and a character recognition unit 20. The scanning unit 16 utilizes conventional optical scanning techniques to scan a document containing handwritten characters and provide digitized data representative of the scanned document to the segmentation unit 18. If the scanned document includes pre-printed elements, the segmentation unit 18 is preferably provided with a preprocessing unit 22 that removes any pre-printed elements that may be present on the document such as the guide line 10, separator lines 12 and title 14 illustrated in FIG. 1 from the digitized data. For example, masks can be used to delete the titles and vertical and horizontal histograms can be employed to identify vertical and horizontal lines, although other techniques may be readily employed. The digitized data representative of the handwritten characters that remains after preprocessing by the preprocessing unit 22 is supplied to a vertical histogram processing unit 24.

Figure 9:
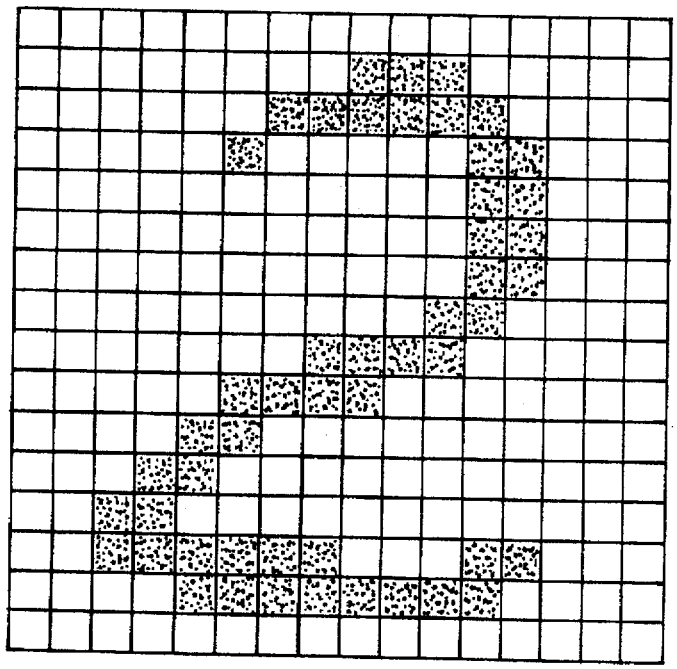
FIG. 9 illustrates a digitized character to which a vertical histogram is applied.

The vertical histogram processing unit 24 calculates a vertical histogram to identify zero points indicative of segmentation points. FIG. 9, for example, illustrates a grid-like pattern of pixels representative of a scanned handwritten "2". A vertical histogram of the digitized image data is produced by counting the number of active pixels (black) in each column. If the columns are numbered from one to sixteen from left to right, the histogram has the values illustrated in Table 1.

The zero points identified at columns 1, 2 and 14–16 are indicative of segmentation points. The vertical histogram processing unit 24 divides the digitized data into character blocks based on the identified zero points, and tests the character blocks to determine if a single character is present within each character block, for example, by comparing the length of the block with one or more predetermined thresholds indicative of single characters. If each character block contains a single character, further segmentation processing is not required and the character blocks can be directly forwarded to the character recognition unit 20. In most cases, however, at least one character block is identified as containing more than one character and further segmentation processing is required prior to character recognition.

Figure 10:
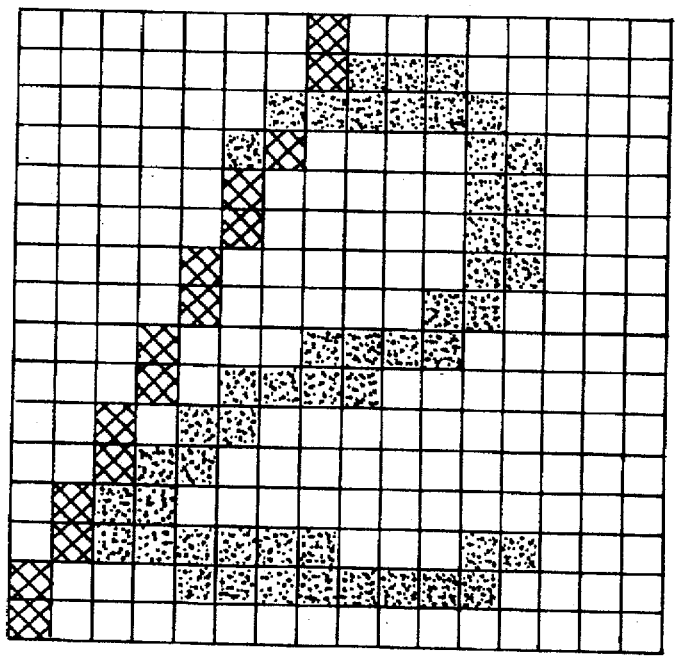
FIG. 10 illustrates a digitized character to which a slant histogram is applied.

The character blocks identified as containing more than a single character are supplied to a slant histogram processing unit 26. The slant histogram processing unit 26 calculates a set of slant histograms for each character block, wherein each slant histogram uses a slightly different slant. For example, given a specific slant as a rational number, a histogram of a raster-encoded image can be efficiently produced with "columns" as the specified slant. The columns contain those squares in the grid, however, that form approximations of lines at the given slant. If the desired slant is 2/1, that is, a change upwards of two pixels for every change to the fight of one pixel, the slanted column 0 would count the bottom two pixels in vertical column 0, then the third and fourth pixels in vertical column 1, the fifth and sixth pixels in vertical column 3 and so forth. The pixels contained in column 0 of the 2/1 slant histogram are shown in FIG. 10. The column marked with cross-hatched squares in FIG. 10 contains a single active pixel. The value in the 2/1 slant histogram that corresponds to this column is therefore one. It is clear that, if the marked column is taken to be the new column 0, that any of the pixels to the left of this column will remain uncounted in the histogram, while the 16th column will extend beyond the right-hand side of the image and count nonexistent pixels. This problem may be solved by increasing the number of columns in the histogram so that columns that only partially intersect the image are also included. The pixels that lie in these columns outside the boundary of the image are assumed to be empty. Since the histogram under consideration has a slant of 2/1 and a height of sixteen pixels, it can easily be calculated that the number of additional columns needed to cover the entire image is 16/(2/1) or eight, although only seven additional columns are required in this particular example. Table 2 below shows the complete 2/1 slant histogram.

TABLE 2

| Column | 1 | 2 | 3 | 4 | 5 | 6 | 7 | 8 | 9 | 10 | 11 | 12 |
|---|---|---|---|---|---|---|---|---|---|---|---|---|
| Value | 0 | 0 | 0 | 0 | 0 | 0 | 2 | 1 | 5 | 7 | 5 | 5 |
| Column | 13 | 14 | 15 | 16 | 17 | 18 | 19 | 20 | 21 | 22 | 23 | 24 |
| Value | 6 | 7 | 6 | 2 | 1 | 2 | 2 | 0 | 0 | 0 | 0 | 0 |

Figure 11:
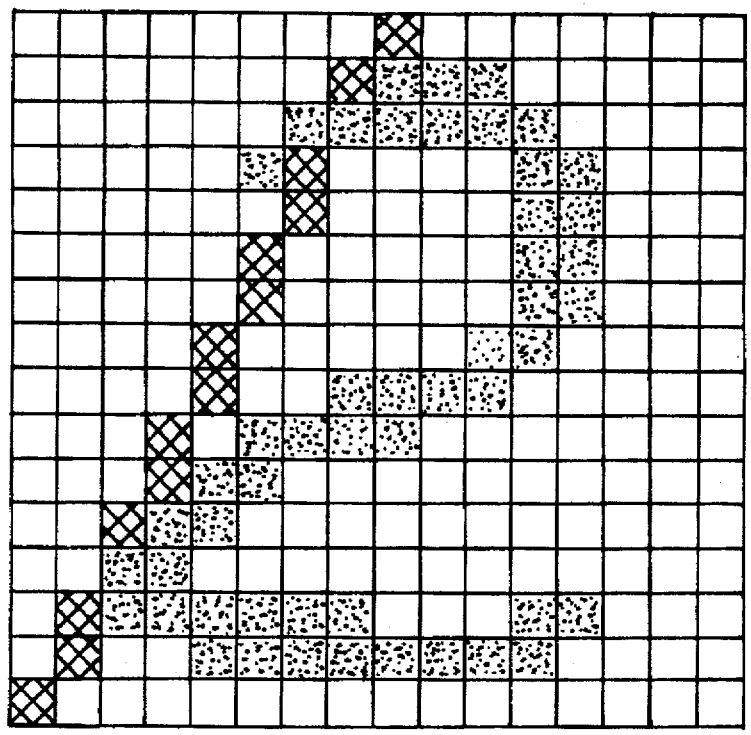
FIG. 11 illustrates a digitized character to which a slant histogram is applied.

FIG. 11 illustrates an alternative mapping of the left most complete column in the 2/1 slant histogram. The point at

TABLE 1

| Column | 1 | 2 | 3 | 4 | 5 | 6 | 7 | 8 | 9 | 10 | 11 | 12 | 13 | 14 | 15 | 16 |
|---|---|---|---|---|---|---|---|---|---|---|---|---|---|---|---|---|
| Value | 0 | 0 | 2 | 3 | 4 | 5 | 4 | 5 | 5 | 4 | 5 | 8 | 5 | 0 | 0 | 0 | which the slanted column shifts to the next vertical column has been shifted by one row. The histogram for the alternative 2/1 slant, row-shifted columns is shown in Table 3.

TABLE 3

| Column | 1 | 2 | 3 | 4 | 5 | 6 | 7 | 8 | 9 | 10 | 11 | 12 |
|--------|---|---|---|---|---|---|---|---|---|----|----|----|
| Value  | 0 | 0 | 0 | 0 | 0 | 0 | 0 | 2 | 2 | 6  | 6  | 6  |
| Column | 13| 14| 15| 16| 17| 18| 19| 20| 21| 22 | 23 | 24 |
| Value  | 6 | 8 | 8 | 4 | 1 | 1 | 2 | 1 | 0 | 0  | 0  | 0  |

The second version of the histogram displays some differences from the first. For example, the peak at columns 14 and 15 is more clearly exposed than in the previous histogram. To produce the most accurate histogram at a given slant, a final histogram that averages all values for a given column over the histograms produced by different row shifts may be made. In the case of the 2/1 slants, only two row shifts are possible. All others are symmetric to the two examined in FIGS. 10 and 11. Therefore the most reliable 2/1 histogram averages together the two already shown.

If the desired slant were 5/2, five different row shifts would be possible. It would therefore be necessary to produce five histograms at the 5/2 slant and average the five together to produce an average histogram. As the numerator and denominator in the slant become increasingly large, a large increase in the ways of mapping the slanted columns to the image occurs. To produce the most representative histogram at a given slant may become computationally to expensive. It has been shown experimentally, however, that the use of any one of the row-shifted versions of a given slant histogram has provided as accurate an interpretation of the image as any of the other and, in general, falls only slightly below that of the averaged histogram. Thus, the additional computation overhead required by the averaged histogram is not necessary, and a single histogram can be utilized.

Figure 12:
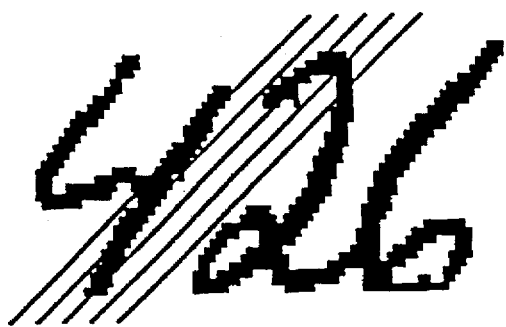
FIG. 12 illustrates the application of a slant histogram to a character block.

FIG. 12 illustrates the first character block shown in FIG. 2 with several of the columns of a slant 1 histogram. The particular columns shown are columns 1, 7, 13, 19 and 25 in the histogram. Column 1 includes a high number of black pixels, while column 19 includes only the width of a stroke. All columns are calculated through the length of the character block to form a complete histogram. Efficient accumulation of the histogram can be accomplished by executing a single pass through all rows of the digitized character block, in a left to right order within each row, and by adjusting the beginning position in the columns of the histogram by the amount of slant accumulated over the number of rows scanned. For example, the accumulated slant is initialized to zero for the example illustrates in FIG. 12. The first (bottom) row is scanned and the pixels are matched and counted one by one with the corresponding column of the histogram. For each move upward to a new row, the accumulated slant is incremented by one, since the slant is 1/1. The offset between the actual beginning of the row in the raster image and the index of the column is the negative of the accumulated slant. In the second row, the accumulated slant is 1 and the offset is −1. The first pixel in the second row therefore corresponds to the column in the histogram with −1 and the second pixel with the column 0. The values in columns with negative indices may either be maintained, if the information in that portion of the image is considered essential, or discarded.

The minima identified by the slant histogram processing unit 26 for each character block are supplied to an evaluation processing unit 28. Zero-value minima identified in the set of histograms calculated by the slant histogram processing unit 26 indicate a segmentation point for kerned characters.

It is preferable to separate kerned characters prior to evaluating the minima to identify segmentation points for touching characters. Once segmentation of kerned characters is accomplished, the new character blocks generated from the segmentation are tested to determine if they contain single characters or multiple characters. If multiple characters are indicated, the evaluation processing unit 28 continues the segmentation process by evaluating the minima to determine segmentation points for touching characters. The evaluation processing unit 28 preferably utilizes a rule-based processing engine to evaluate the minima to assess the width and depth of the minima defined by the minimum values, as well as the magnitude of the minima and relationships of surrounding maxima and minima. In addition, the evaluation processing unit 28 also recognizes multiple evidence for the same potential cut that exists in several different histograms. The digital data representative of the individually segmented characters is then supplied to the character recognition unit 20, which identifies the segmented characters using conventional character recognition techniques.

The invention has been described with reference to certain preferred embodiments thereof. It will be understood, however, that modifications and variations are possible within the scope of the appended claims. For example, the functions performed by the vertical histogram processing unit and the slant histogram processing unit could be performed by a single processing unit if desired, as the vertical histogram is simply a specific case of a slant histogram. Similarly, the functions of the vertical histogram processing unit, slant histogram processing unit and evaluation processing unit can be performed by a single programmed general purpose computer, although a combination of separate processing units, hardware and firmware may also be employed. Still further, alternative decision making units including neural net based units, fuzzy logic units, a Bayes classifier, etc., may be employed for the evaluation processing unit. Finally, the number of slant histograms to be calculated may vary according to the particular application. For example, satisfactory results have been obtained by using a set of slant histograms include −4, −3, 3 and 4 in addition to the vertical, but larger sets of histograms should yield better results in most cases, although a corresponding increase in the amount of computation resources must be considered.

Industrial Utility

The invention provides an apparatus for performing segmentation of digitized character data that can be employed in any type of system requiring optical character recognition of handwritten characters to segment and isolate individual characters prior to preforming a recognition operation.

PARTS LIST
 10 Guide Line
 12 Separator Line
 14 Title
 16 Scanning Unit
 18 Segmentation Unit
 20 Character Recognition Unit
 22 Preprocessing Unit
 24 Vertical Histogram Processing Unit
 26 Slant Histogram Processing Unit
 28 Evaluation Processing Unit

What is claimed:

1. An apparatus for segmenting digitized character data comprising:
   vertical histogram processing means for receiving digitized character data and calculating a vertical histogram for the digitized character data to identify vertical segmentation points, wherein the digitized character data is segmented into character blocks based on the vertical segmentation points;

slant histogram processing means for receiving the character blocks and calculating a set of slant histograms for each character block; and evaluation processing means for evaluating the set of slant histograms calculated for each of the character blocks to identify slant segmentation points based on minima, and for segmenting the character blocks based on the identified slant segmentation points to generate segmented characters.

2. An apparatus as claimed in claim 1, wherein the evaluation processing means identifies slant segmentation points for kerned characters based on zero-value minima.

3. An apparatus as claimed in claim 1, wherein the evaluation processing means identifies slant segmentation points for touching characters by evaluating minima of the slant histograms based on a set of predefined rules.

4. An apparatus as claimed in claim 1, wherein the set of slant histograms includes −4, −3, 3 and 4.

5. An apparatus as claimed in claim 1, further comprising scanning means for generating the digitized character data.

6. An apparatus as claimed in claim 1, further comprising a character recognition processing means for receiving the segmented characters from the evaluation processing means and identifying the segmented characters.

7. An apparatus as claimed in claim 1, wherein the evaluation processing means identifies kerned character slant segmentation points based on zero-value minima, segments the character blocks based on the kerned character slant segmentation points to generated kerned segmented character blocks, evaluates the kerned segmented character blocks to determine if multiple characters are present, identifies touching character slant segmentation points by evaluating minima of the slant histograms based on a set of predefined rules, and segments the kerned segmented character blocks based on the touching character slant segmentation points.

* * * * *